though the process may be carried out at any temperature at which the liquid ammonia is stable as a liquid,
3,102,140
QUATERNARY AMMONIUM SUPEROXIDE COMPOUNDS AND THEIR PREPARATION
Joseph S. Hashman, Evans City, and Jackie C. Renforth, Valencia, Pa., assignors to Callery Chemical Company, Pittsburgh, Pa., a corporation of Pennsylvania
No Drawing. Filed Feb. 27, 1961, Ser. No. 92,090
6 Claims. (Cl. 260—567.6)

This invention relates to new superoxide compounds, the tetraalkylammonium superoxides, and to a method for their preparation.

Superoxides are oxygen-rich compounds containing the $O_2-$ group. Chemically, these compounds are characterized by their high oxidizing power and it is for this reason that they are of interest for synthetic chemistry applications.

Heretofore, only those superoxides in which an alkali metal or alkaline earth metal is combined with the superoxide ion have been known. While several of these compounds have been prepared, there does not appear to be any general method by which superoxides may be produced. For example, one method used is the direct reaction of metal or metal oxides with oxygen; potassium superoxide may thus be produced, but when sodium, barium, or an oxide of sodium or barium is used in this method, the peroxide rather than the superoxide is produced.

It is an object of this invention to provide novel superoxide compounds in which a complex cation is combined with the superoxide ion, namely, tetraalkylammonium superoxides of the formula $R_4NO_2$.

Another object is to provide a method for the preparation of tetraalkylammonium superoxides.

Still other objects will become apparent from the following specification.

This invention is based upon our discovery that a tetraalkylammonium superoxide, $R_4NO_2$, is the product obtained when a tetraalkylammonium halide is electrolyzed and the electrolysis product is reacted with oxygen.

The electrolysis of the tetraalkylammonium halide is carried out in liquid ammonia. It is believed that the tetraalkylammonium ion is produced as a free radical at the cathode. The reaction of oxygen with the free radical is accomplished by passing oxygen into the liquid ammonia solution containing the tetraalkylammonium ion, and may be carried out either during the electrolysis or after the electrolysis is completed.

Although the process may be carried out at any temperature at which the liquid ammonia is stable as a liquid, we have found that at low temperatures the tetraalkylammonium radical is more stable so that such temperatures, i.e., between about $-65$ and $-80°$ C., are preferred in order to increase the yield of superoxide produced. Low temperatures are particularly desirable when the reaction with oxygen is carried out subsequent to the termination of electrolysis.

The method of this invention is illustrated by a test in which a solution of tetramethylammonium chloride in liquid ammonia was electrolyzed for 235 minutes under a constant current of 95 milliamperes, using a 500 milliliter glass cell with a platinum cathode and a magnesium anode. During the electrolysis, the temperature of the solution was about $-70°$ C. and tetramethylammonium free radicals were liberated at the cathode and magnesium chloride formed at the anode. A stream of oxygen gas was bubbled through the solution during the electrolysis; the solution became yellow after about 40 minutes and remained so throughout the rest of the run. After the run the ammonia was distilled off, leaving a yellow solid. The solid was analyzed and shown to be 55% magnesium chloride. The remainder was analyzed for superoxide oxygen and its ultra-violet spectrum was studied; it was found to be tetramethylammonium superoxide, $$(CH_3)_4NO_2$$

along with a small amount of residual tetramethylammonium chloride.

Other tetraalkylammonium superoxides of the formula $R_4NO_2$, where R is a lower alkyl group, are produced in a similar manner by the use of a tetraalkylammonium halide having the desired alkyl group. Thus, for example, tetraethylammonium superoxide, $(C_2H_5)_4NO_2$, is made from tetraethylammonium chloride and tetrapropylammonium superoxide, $(C_3H_7)_4NO_2$, is produced from tetrapropylammonium chloride. Similarly, halides other than the chloride can be used in the process, one example being tetramethylammonium fluoride.

Tetramethylammonium superoxide is a yellow solid which is soluble in liquid ammonia; it contains 45.3% carbon, 11.3% hydrogen, 13.2% nitrogen, and 30.2% oxygen. It melts at 157–159° C. in a sealed tube, and decomposes at a slightly higher temperature. It will readily react with water to produce pure oxygen and tetramethylammonium hydroxide, and since it is reactive with atmospheric moisture, it should be protected from the atmosphere.

This reactivity with moisture gives the tetraalkylammonium superoxides utility in self-contained breathing apparatus, such as is employed in nonrespirable atmospheres and for high altitude flying, in partial or total replacement of potassium superoxide now in use for this purpose. The reactivity of these superoxides with water to produce pure oxygent also provides a very convenient means for the production of pure oxygen when quickly needed in modest amounts. When maintained in a suitable closed vessel under an oxygen atmosphere, desired amounts of oxygen can be produced and removed for immediate use by metering into the vessel appropriate amounts of water to control the speed and extent of the oxygen producing reaction. These compounds are also excellent oxidizing agents for carrying out oxidizing chemical reactions and are useful as intermediates in the synthesis of other complex compounds wherein the quaternary ammonium or superoxide ion is desired to be introduced.

This application is a continuation-in-part of our application, Serial No. 832,864, filed August 10, 1959, now abandoned.

According to the provisions of the patent statutes, we have explained the principle and mode of practicing our invention, and have described what we now consider to be its best embodiments. However, we desire to have it understood that within the scope of the appended claims, the invention may be practiced otherwise than as specifically described.

We claim:
1. A tetraalkylammonium superoxide of the formula $R_4NO_2$ where R is a lower alkyl group.
2. Tetramethylammonium superoxide, $(CH_3)_4NO_2$.

3. A method for the preparation of tetraalkylammonium superoxide which comprises electrolysis of tetraalkylammonium halide in liquid ammonia using a magnesium anode, reacting the tetraalkylammonium radicals thus formed with molecular oxygen, and recovering the tetraalkylammonium superoxide produced.

4. A method in accordance with claim 3 in which the tetraalkylammonium group is tetramethylammonium.

5. A method in accordance with claim 3 in which the liquid ammonia containing the tetraalkylammonium free radicals is maintained at a temperature between about −65° C. and −80° C. until the reaction with oxygen is completed.

6. A method for the preparation of tetramethylammonium superoxide which comprises electrolyzing tetramethylammonium chloride in liquid ammonia using a platinum cathode and a magnesium anode, reacting the tetramethylammonium free radicals thus formed with molecular oxygen, and recovering the tetramethylammonium superoxide produced.

No references cited.